United States Patent [19]
Olsen

[11] 3,745,115
[45] July 10, 1973

[54] METHOD AND APPARATUS FOR REMOVING AND RECLAIMING OIL-SLICK FROM WATER

[76] Inventor: Martin F. Olsen, 3192 Cambridge Avenue, New York, N.Y. 10463

[22] Filed: July 13, 1970

[21] Appl. No.: 54,509

[52] U.S. Cl............ 210/83, 210/DIG. 21, 210/97, 210/119, 210/242
[51] Int. Cl... B01d 21/00, B01d 33/40, E02b 15/04
[58] Field of Search............ 210/83, 242, DIG. 21, 210/169, 97, 119; 61/1 F, 1 R, 69

[56] References Cited
UNITED STATES PATENTS

| | | | |
|---|---|---|---|
| 2,539,748 | 1/1951 | Mueller | 210/103 |
| 3,534,858 | 10/1970 | Harrington | 210/242 |
| 3,578,171 | 5/1971 | Lisher | 210/242 |
| 154,158 | 8/1874 | Spooner | 210/242 |
| 407,250 | 7/1889 | Roeske | 210/242 X |
| 3,109,812 | 11/1963 | McAulay et al. | 210/242 |
| 3,534,859 | 10/1970 | Amero et al. | 210/242 |

FOREIGN PATENTS OR APPLICATIONS

| | | | |
|---|---|---|---|
| 804,368 | 11/1958 | Great Britain | 210/242 |
| 866,659 | 4/1961 | Great Britain | 210/242 |

*Primary Examiner*—Samih N. Zaharna
*Assistant Examiner*—T. A. Granger
*Attorney*—Allison C. Collard

[57] ABSTRACT

One or more floats are provided for immersion in an oil-slick affected water area, the floats having a collecting compartment and a ballast compartment, and a limit valve for the ballast compartment, such that the floats will be partially submerged at the level of the collecting compartment so that the oil and water mixture may be collected. Flexible tubes are also provided for the collecting compartment for transferring the collected oil and water mixture to a separation tank. The separation tank has two ball float control valves, one of which permits the clean water to drain back into the environmental water area and the other of which permits the collected oil to be drained off for further use or refinement.

6 Claims, 7 Drawing Figures

Patented July 10, 1973
3,745,115
3 Sheets-Sheet 1
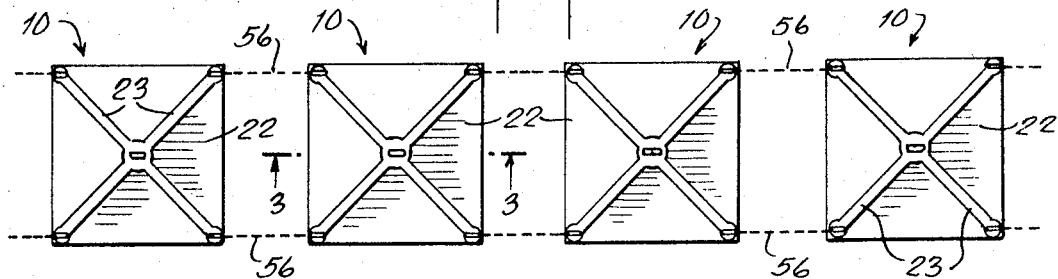
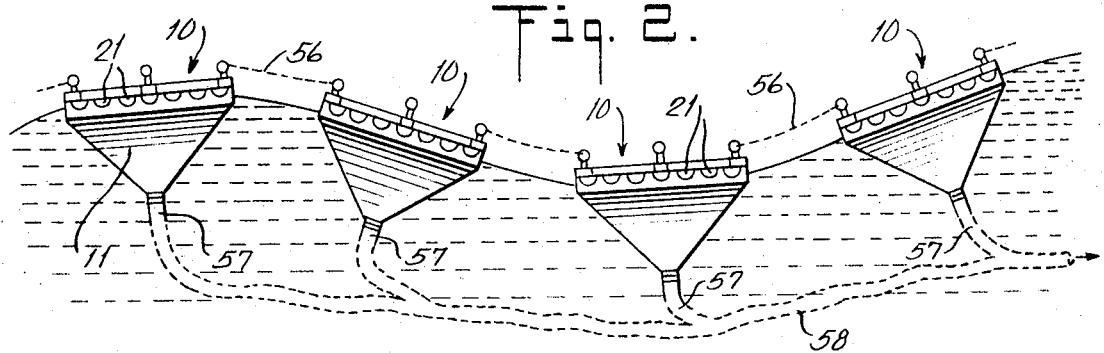
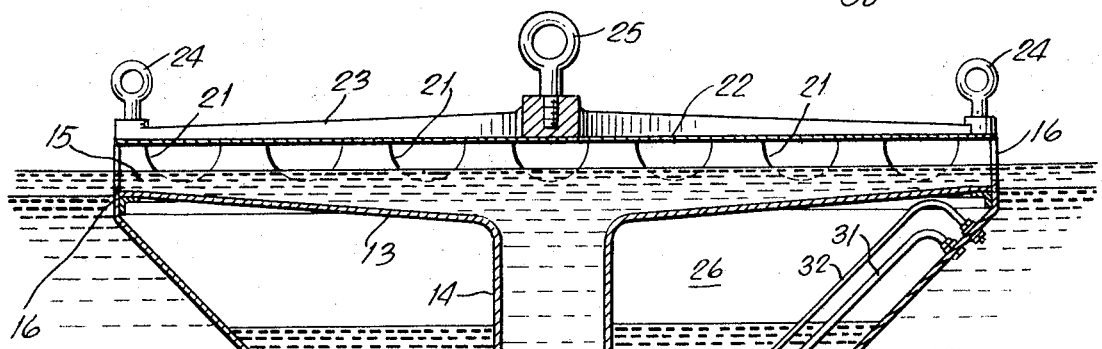
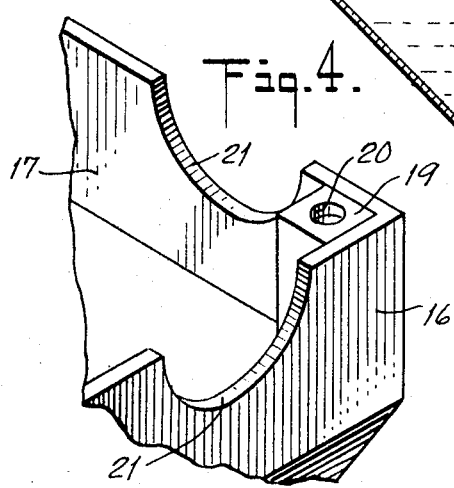
INVENTOR.
MARTIN F. OLSEN
BY
Howard J. Churchill
ATTORNEY Patented July 10, 1973  3,745,115

INVENTOR.
MARTIN F. OLSEN
BY
Howard J. Churchill
ATTORNEY

INVENTOR.
MARTIN F. OLSEN

METHOD AND APPARATUS FOR REMOVING AND RECLAIMING OIL-SLICK FROM WATER

The present invention relates to a method and apparatus for removing and reclaiming oil-slick from sea or fresh water.

More particularly, the present invention provides a float for immersion in an oil-slick affected area of the sea, a lake, river or the like, — the float being so constructed that its water displacement is such that the float side openings will be maintained at watersurface level whereby the oil-slick which floats on top of the water may be readily collected in such float, through side openings, while admitting a minimum amount of water and debris. The present invention also contemplates that a plurality of such floats may be flexibly connected together by chains or the like so that the floats may rise and fall with the waves of a rolling sea or disturbed fresh water area and collect the oil-slick on the surface thereof.

The present invention also provides for the collection of such removed oil-slick and water in a separation tank where the oil is recovered and the water is returned to the sea, lake, river, etc.

In the prior art there have been various proposals for handling, confining and recovering the oil of oil-slicks which result either from accidental oil discharge from tankers or the like or from intentional emptying of oil bunkers at or near the end of a voyage.

In none of such prior art devices, however, has there been provided a float construction wherein a float having a predetermined displacement is immersed and maintained at a level in the oil-slick affected water area so that the oil will be collected through side openings provided in such float while excluding most debris and substantially limiting the amount of water collected with the oil. Furthermore, none of such prior art devices provide for the ready separation of the oil and water collected in such floats, the recovery of the oil, and the return of the cleaned water to the affected area.

It is an object of the present invention to provide a method and apparatus for collecting oil from an oil-slick affected water area, to separate the oil from the water, to recover the oil, and to return the cleaned water to such affected area, It is also an object of the present invention to provide an apparatus and method of oil-slick recovery which accommodates to the rise and fall of the waves of a moderate rolling sea or other disturbed water surface so that the oil on the surface of such sea or other water area may be readily collected without collecting a mixture containing an excessively large amount of water.

With these and other objects in view, reference will now be made to the accompanying drawings, wherein the preferred embodiment of the apparatus is shown, and wherein FIG. 1 is a top plan view of a plurality of floats provided by the present invention.

FIG. 2 is a front elevational view of the floats shown in FIG. 1, and also showing the floats immersed in an oil-slick affected water area, and flexible tubing connected to the conical base of each float, and showing the floats accommodating to a moderate rolling sea.

FIG. 3 is an enlarged vertical sectional view of one of the floats of FIG. 1, taken on the line 3—3, and looking in the direction of the arrows.

FIG. 4 is an enlarged fragmentary view, in perspective showing one corner of a float with the cover plate removed.

Figure 5:
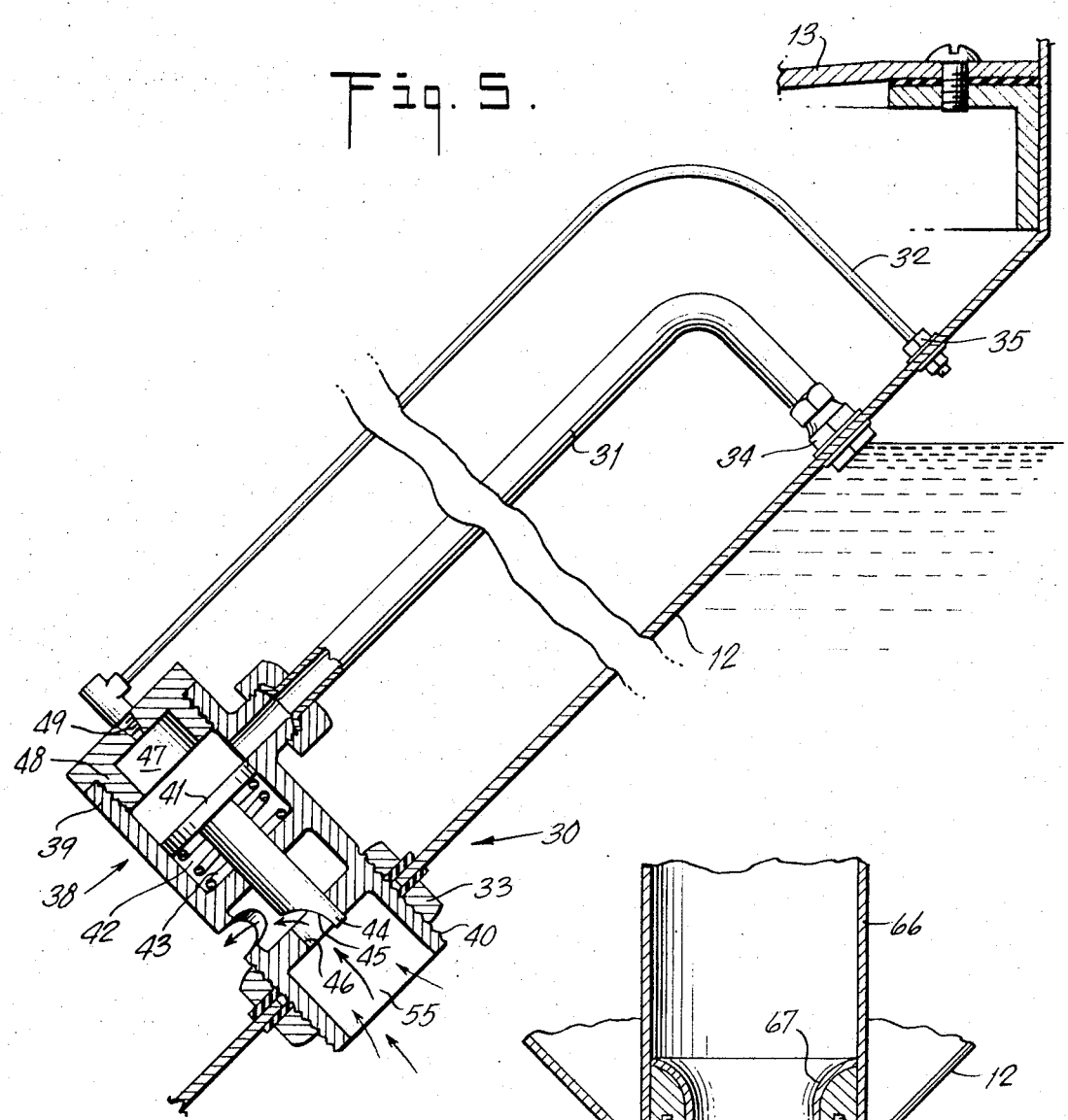
FIG. 5 is a side elevational view, partly in section, showing the ballast limit valve for the float provided by the present invention.

Reference will now be made to the drawings for a detailed understanding of the preferred embodiment of the invention.

It will be understood that the method of the present invention contemplates that it be used with a ship or barge which has sufficient pumping capacity and is capable of being moved through a water surface covered with oil. It may also be used at an off-shore oil platform or a tanker loading pier, to contain and draw off oil spillage.

The present invention provides a plurality of floats 10 each having a hollow body portion 11 composed of an outer shell 12 and an inner shell 13. The latter, in turn, is connected to an inner tube 14. The upper wall of the inner shell 13 constitutes the bottom of the oil and water collecting compartment 15 of the float 10, such compartment being generally rectangular in plan view and having side walls 16 and 17 and corner blocks 19 with a threaded hole 20 therein. Each side wall 16 and 17 is provided with a plurality of spaced semicircular cut outs 21 which approximate one-half the height of the side walls and extend downwardly from the upper edge of each such side wall.

A cover plate 22 of rectangular shape in plan view, having crossed bracing ribs 23, threaded eye bolts 24 at each corner and a lifting eye 25 is suitably mounted on top of the float to close the top of the oil and water collecting compartment, such cover plate being securely fastened to the side walls 16 and 17 by means of the eye bolts 24 which are threaded into the threaded holes 20. With the cover plate 22 in place, the semicircular cut outs 21 constitute the only access of the oil and water mixture to the collecting compartment 15.

As illustrated in the drawings and as will be hereinafter more fully described, the float 10 is so designed and constructed that the water surface with the oil slick thereon will be at a level with respect to the float such that cut outs 21 in the side walls will be partially submerged and thereby permit the oil and water mixture on the surface of the water to drain into the collecting compartment 15.

The float 10 of the present invention is so designed and constructed that the cut outs 21 in the side walls of the collecting compartment 15 will always be maintained partially submerged. With the present invention this is accomplished by providing a ballast compartment 26 between the outer shell 12 and the inner shell 13 for receiving an adequate amount of water to provide the necessary ballast to assure that the collecting compartment is always at the proper water surface level.

Referring now particularly to FIGS. 3 and 5 of the drawings it will be noted from FIG. 3 that there is provided in the ballast compartment 26 a ballast limit valve 30. Such ballast limit valve generally consists of a water intake conduit 31 and an air vent 32 both of which are disposed close to the inner shell 13 which forms the bottom of the collecting compartment 15, with the air vent tube disposed nearer to such collecting compartment.

Referring now specifically to FIG. 5 wherein such ballast limit valve is shown in detail, it will be noted that such ballast limit valve is suitably mounted in the outer shell 12 forming part of the ballast compartment 26. The water intake conduit 31 is provided with a watertight connection with such outer shell by suitable threaded couplings and gaskets 34. The air vent tube 32 is also suitably attached to the outer shell 12 of the ballast compartment 26 to provide a leakproof connection therewith by suitable couplings and gaskets 35.

At the lower end of the ballast limit valve 30 there is a combined piston and valve assembly 38 having a housing 39 for a screwthreaded end 40 which is suitably mounted in the opening provided in the outer shell 12 of the ballast compartment 26 by means of screwthreaded collars and suitable gaskets to provide a leaktight seal therewith.

Disposed within the housing 39 is a piston 41 operating within the piston chamber 42 formed in such housing. The piston is provided with a compression spring 43 which operates against one face of such piston. The piston is also provided integrally with a valve closing member 44 having an arcuate face 45. Such valve member engages in an intake port 46 which permits intake of water into the ballast compartment and then cuts off such intake when the desired amount of ballast water has been accumulated.

It will be noted that in the ballast limit valve construction on the side of the piston 41, opposite the spring 43, there is an open area 47 with which the water intake conduit is in direct communication. It will also be noted that the screwthreaded plug 48 which is screw-threadedly connected to the housing 39 to provide such open area, has an airtight nipple construction which provides a direct connection with the air vent tube 32.

Thus it will be noted that when the float 10 is immersed in the water, water will enter the ballast compartment 26 through the intake opening 55 in the housing 39 past the arcuate face of the valve closing member 44 into the ballast compartment as shown by the arrows in FIG. 5. As the ballast compartment continues to fill up, the upper end 34 of the water intake conduit 31 will be brought below water level and will provide water in the open area 47 while the displaced air is exhausted through the air vent tube 32. The water pressure which then accumulates in the open area 47 will act against the piston 41 and start to close the valve member 44.

When the water fills the area 47 behind the piston 41 the head of water is sufficient to close the valve member 44 and thereby maintain the float at the desired water level. This construction operates despite variations in water density for the reason that the density of the water outside the float is directly compensated for by the density of the water within the ballast compartment.

As before stated with reference to FIG. 2, a plurality of floats 10 may be connected in spaced relationship by means of flexible chains or other connecting members 56 which are attached to the eye bolts 24 located at each of the corners of the floats. With such flexible connections a series of floats 10, as best shown in FIG. 2 can follow the surface of a moderately rolling sea and still perform their function and purpose of collecting the oil-slick with a minimum amount of water.

Figure 7:
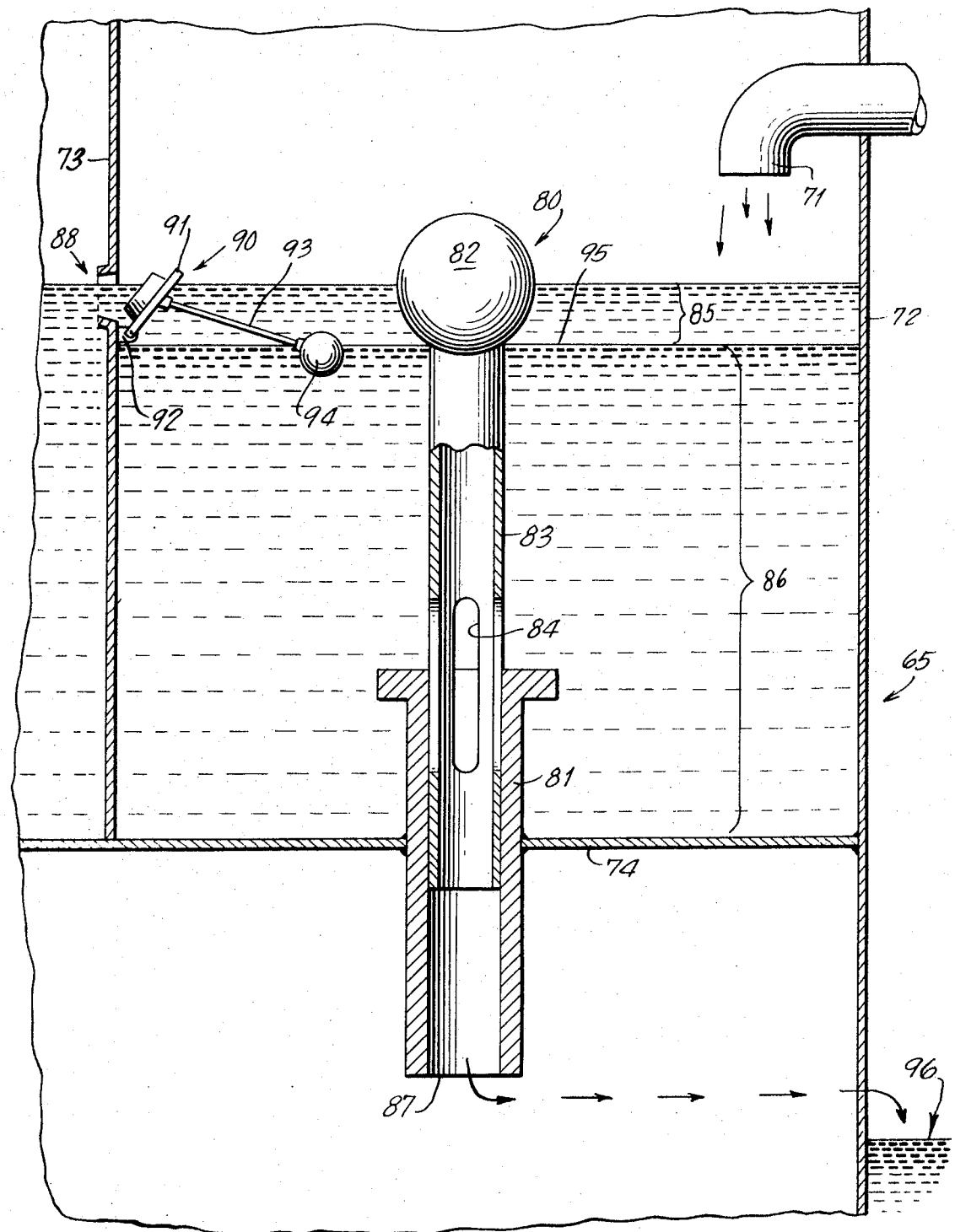
FIG. 7 is a fragmentary, vertical sectional view of a separation tank provided by the present invention, where the collected oil and water is separated and the cleaned water is returned to the affected area.

It will also be noted from FIG. 2 that each float 10 is provided with a flexible hose 57 and that each such flexible hose is in turn connected to a common hose 58 which, in turn, is connected to a pump provided on a ship, barge, or other structure, also having on board a separation tank 65 as generally shown in FIG. 7.

Figure 6:
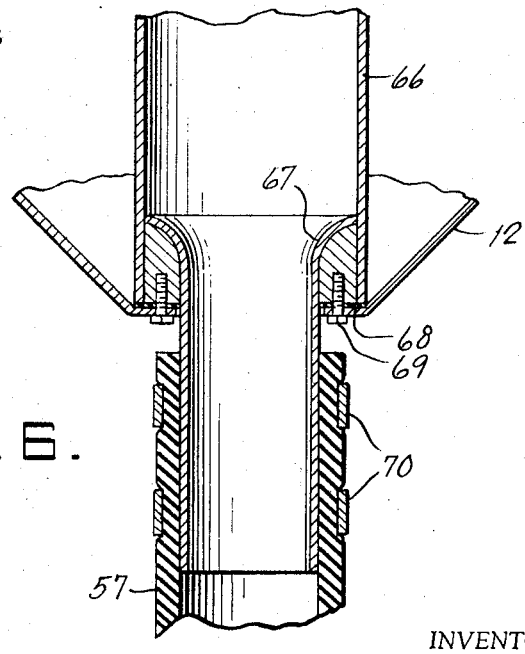
FIG. 6 is an enlarged vertical sectional view showing details of construction of the conical base of the float and its connection to a flexible tube.

Before taking up the separation tank, reference is now made to FIGS. 3 and 6, which show the connection of the flexible hose 57 to the float 10.

The inner shell 13 in addition to providing the bottom wall for the collecting compartment 15 also has a downwardly extending tubular portion 66 into which is seated an outwardly flared rigid nipple 67 having a watertight seal with said tube 66 and the outer shell 12 by means of a sealing gasket 68 suitably assembled by means of screws 69.

The flexible hose 57 is retained on the nipple 67 by hose straps 70.

The water and oil mixture which is collected in the collecting compartment 15 is continuously removed from such collecting compartment by means of a pump located on an adjacent ship, barge or other structure and is pumped into a separation tank 65 shown in FIG. 7. The open discharge end of a pipe or hose coming from such pump is shown at 71, with the arrows adjacent such open-discharge end indicating oil and water mixture entering the separation tank 65 above the level maintained in such tank as will now be described.

The separation tank 65 has side walls 72, 73 and a bottom 74. The discharge end of the pipe 71 is disposed in side wall 72. A vertically slidable ball float valve 80 is mounted for vertical movement in valve sleeve 81 mounted in an opening provided in the bottom 74 of the separation tank. Such ball float valve has a ball float 82 which keeps the valve sliding element 83 in the form of a hollow tube normally in a position where the float member is partially immersed in the oil and water mixture, as shown in FIG. 7. The sliding member 83 of such ball float valve 80 has an elongated slot 84 which is closed when such sliding member 83 moves within the sleeve 81 and such aperture is wholly contained within such sleeve.

In the separation tank 65 the collected oil will form a surface layer as shown in FIG. 7 at 85. The separated water will constitute a much larger layer generally indicated as 86. When the water and oil level is as shown in FIG. 7 water from the separated water stratum will exit from the tank through the slot 84 into the hollow valve sliding member 83, the valve sleeve 81 and out the open end 87 of such sleeve and be returned in clean form to the sea, lake or other water area from which the oil has been recovered.

It will be noted that in wall 73 of the separation tank an exit port 88 is provided at the level of the oil stratum 85 so that the recovered oil can be collected through such port for further use or refining. A ball float valve 90 having a valve member 91 cooperating with a valve seat provided in such port is suitably hinged at 92, said valve member 91 having a link 93 and a ball float 94 which preferably is so designed that it floats at the interface 95 of the oil and water. Thus as long as the interface is disposed below the exit port 88 the valve will be opened and the recovered oil will drain off. If the water level should rise the valve will close and prevent oil drain-off until sufficient oil collects on the surface of the water in the separation tank to lower the interface below the position of the exit port.

It will be noted from FIG. 7 that the water discharge end of the valve sleeve 81 is shown as being above the level of the environmental water 96, surrounding the ship, barge or other structure on which such separation tank is mounted. In this way the separated clean water is discharged by gravity and causes the minimum of disturbance to such environmental water from which recovery of oil is still being conducted.

While the present invention has been illustrated and described in its preferred forms, it will be understood that variations may be made therein without departing from the scope of the appended claims.

What I claim is:

1. The method of recovering oil-slick on a water surface which comprises the steps of:
    a. immersing in the oil-slick water area a plurality of individual floats each having a collecting compartment, a ballast compartment and a flexible hose connecting each collecting compartment to a common flexible hose;
    b. means for transferring the oil and water mixture collected in such common flexible hose to a separation tank onboard a separate structure;
    c. separating said oil and water mixture in such separation tank into respective layers of oil and water;
    d. returning the separated water by means of a ball float control valve and gravity to the environmental water area; and
    e. removing the separated oil in the separation tank from the surface of the water through an exit port provided in the wall of such tank, and controlling such removal by means of a ball float valve having a ball float which floats at the interface of the oil and water.

2. An apparatus for recovering oil-slick from a water surface comprising a plurality of floats immersible in water, each float having a collecting compartment with side walls and a cover, with openings provided in such side walls to admit an oil and water mixture, a ballast compartment for receiving and retaining water at a controlled height, whereby said floats are maintained at predetermined positions with respect to the water surface with the openings in the side walls of the collecting compartments partially below the water surface, said floats each having a flexible tube at its lower end connected to the collecting compartment, each such tube in turn connected to a common flexible tube for delivery of such oil and water mixture to a separation tank, such separation tank in turn having a first ball float valve having a hollow sliding member provided with a longitudinal slot opening mounted for sliding engagement in an open-ended sleeve supported in the bottom of said separation tank, whereby such first ball float valve will permit drain-off of the water in such separation tank when such longitudinal slot opening is disposed above the level of such sleeve.

3. An apparatus according to claim 2, wherein an exit port is provided in one of the walls of the separation tank at substantially the level of the separated oil for draining off the oil through such port, and a second ball float valve is hingedly connected to said wall to close said exit port when the water level in the separation tank rises above the level of said exit port, said second ball float being constructed to float at the interface of the oil and water in such separation tank.

4. An apparatus for recovering oil slick from a water surface, comprising:
    a float immersible in water having a collecting compartment with side walls, a cover disposed over said collecting compartment, openings provided in said side walls to admit an oil and water mixture to said collecting compartment, and a ballast compartment within said float separated from said collecting compartment; and
    a limit valve means disposed in the lower region of said ballast compartment with an intake thereinto in fluid communication with the exterior of said float and an outlet from said valve means in fluid communication with said ballast compartment for automatically admitting water at a controlled height to said ballast compartment, said valve means having a piston, a piston chamber, and a valve member actuated by said piston, and including a conduit with an intake in fluid communication with the exterior of said float and an outlet in fluid communication with said piston chamber for admitting water to said piston chamber to move said piston to close said valve when said openings to said collecting compartment are disposed partially below the surface of the water, said valve being responsive to said water admitted thereto by said conduit.

5. An apparatus according to claim 4 comprising a plurality of said floats wherein each of said floats has a flexible hose connected to the lower end of said collecting compartment and each of said flexible hoses is in turn connected to a common flexible hose whereby said collecting compartments of said floats are coupled together in series by said hoses and all of the oil and water mixture collected within said collecting compartments may be discharged through said hoses into a separation tank.

6. An apparatus according to claim 5 wherein each of said floats is rectangular in plan view and has an eye bolt at each upper corner of said float constructed and arranged to retain said covers over said collecting compartments and to provide connection means for flexible cable which joins said floats in series in a continuous line.

* * * * *